3,099,664
7-CYANO ANDROSTANE COMPOUNDS
Howard J. Ringold and Albert Bowers, Mexico City, Mexico, assignors, by mesne assignments, to Syntex Corporation, a corporation of Panama
No Drawing. Filed Jan. 4, 1960, Ser. No. 55
Claims priority, application Mexico Jan. 12, 1959
20 Claims. (Cl. 260—397.3)

This invention relates to a new method for preparing the novel 7-cyano-androstanes of the following general formulas:

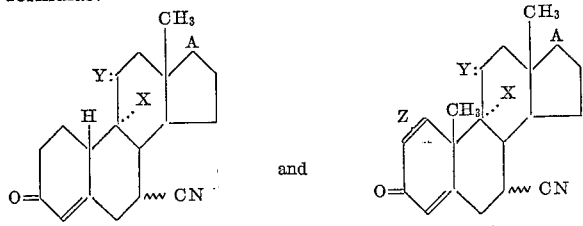

and in which A is an arrangement selected from the group consisting of

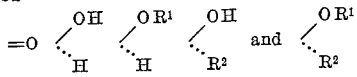

wherein $R^1$ is an acyl radical derived from a hydrocarbon carboxylic acid having up to about 12 carbon atoms and $R^2$ is an aliphatic hydrocarbon radical selected from the group of lower alkyl, alkenyl and alkynyl radicals; Y is an arrangement selected from the group consisting of

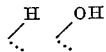

and =O; X is hydrogen when Y is

and is selected from the group consisting of hydrogen and fluorine, when Y is a member of its group other than

Z represents the linkage between C–1 and C–2 selected from the group consisting of single and double bond, and ⌇CN is selected from the group consisting of 7α-cyano and 7β-cyano.

Where the wavy line (⌇) is used in this application, it represents a generic expression for the α- and β-steric configurations of substituents at C–7 of the respective steroid molecule.

Among the 7(α and β)-cyano-androstane derivatives represented by the second of the above general formulas, as new compounds according to the invention, there are mentioned 7(α or β)-cyano-Δ⁴-androstene-3,17-dione and 7(α or β)-cyano-testosterone as well as their 17α-alkyl, alkenyl, and alkynyl-derivatives, their 11-keto-, 11β-hydroxy-, 9α-fluoro-11-keto- and 9α-fluoro-11β-hydroxy-derivatives, and furthermore the 1-dehydro derivatives and the 17-esters of all of the aforementioned compounds; the first of the above formulas represents the 19-nor analogs of all of the above Δ⁴-compounds.

Acyl groups $R^1$ at C-17 are derived from any carboxylic acid of 1 to about 12 carbon atoms, saturated or unsaturated, of straight, branched, cyclic or mixed cyclic-aliphatic chain, with or without functional substituents such as hydroxyl, acyloxy (of 1 to 12 carbon atoms), alkoxy (of 1 to 5 carbon atoms) or halogen, such as chlorine or fluorine; typical for such esters of the 7-cyano-testosterones are, among others, the acetate, propionate, t-butylacetate, hemisuccinate, enanthate, caproate, benzoate, trimethylacetate, phenoxyacetate, cyclopentylpropionate and β-chloropropionate; the radical $R^2$ at C-17α may be an alkyl radical of up to 5 carbon atoms, such as methyl or ethyl, an alkenyl radical, such as vinyl or propenyl, or an alkynyl radical, such as, for example, ethynyl or propynyl.

Specific compounds pertaining to the novel steroidal derivatives according to the invention are beside those already mentioned the 7α- and 7β-cyano derivatives of 17α-methyl-testosterone, 17α-ethyl-testosterone, 17α-vinyl-testosterone, 17α-propen(1-)yl-testosterone, 17α-ethynyl-testosterone, 17α-propyn(1-)yl-testerone, as well as all of the aforementioned compounds having a keto or β-hydroxyl group at C-11, or a keto group or β-hydroxyl group at C-11 together with a fluorine atom at C-9α; the 7α- and 7β-cyano derivatives of 19-nor-testosterone, 17α-methyl-19-nor-testosterone, 17α-ethyl-19-nor-testosterone, 17α-vinyl-19-nor-testosterone, 17α-propen(1-)yl-19-nor-testosterone, 17α-ethynyl-19-nor-testosterone, 17α-propyn(1-)yl-19-nor-testosterone, 19-nor-Δ⁴-androstene-3,17-dione, as well as the aforementioned compounds having a keto or β-hydroxyl group at C-11, the 11-(keto or β-hydroxyl)-19-nor-testosterones, which may be optionally fluorinated at C-9α and which may have a hydrogen atom or a methyl group at C-17a.

The new compounds which are the object of the present invention, having an alkyl or alkenyl group at C-17α are anabolic hormones of the androgenic type which show a favorable anabolic-androgenic ratio and exhibit anti-gonadotrophic activity; the 17α-alkynyl-testosterones are potent progestational agents.

The novel compounds according to the present invention can be produced by a process which is illustrated by the Reaction Diagram I shown below and essentially involves the introduction of the cyano group at C-7 into the 6-dehydro-derivative (I) of the compounds which are going to be subjected to such introduction.

REACTION DIAGRAM I

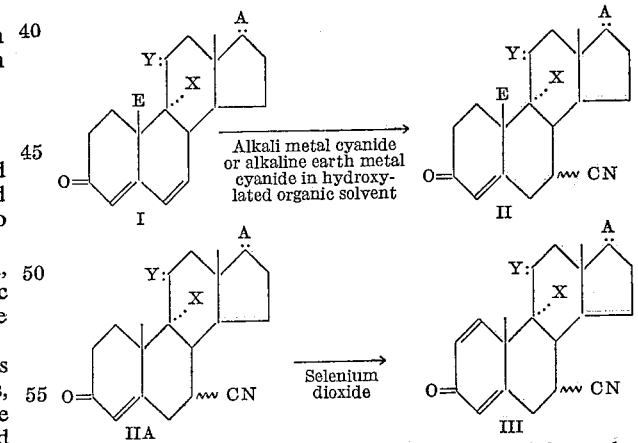

in which the equations A, X, Y and ⌇CN have the meaning described hereinbefore and E is a member of the group consisting of hydrogen and methyl.

If the resulting Δ⁴-7-cyano compound (II) belongs to the 10-methyl series (IIA), it can subsequently be dehydrogenated at C-1 to produce the respective 7-cyano-1,4-dienes (III).

For preparing the starting 6-dehydro compounds we applied methods which have already been described; in the compounds of the 10-methyl series we introduced the double bond at C-6,7 by refluxing with chloranil in mixture with xylene (cf. Agnello and Laubach, J. Am. Chem. Soc., 79, 1257 (1957)) or in mixture with ethyl acetate and acetic acid; in the 19-nor-Δ⁴-3-ketones we introduced the double bond at C-6,7 by formation of their 3-enol-ethers followed by reaction with hypobromous acid and dehydrobromination of the resulting 6β-bromo-19-nor-Δ⁴-3-ketones (cf. Bowers, Casas, Zderic and Djerassi, patent application Serial No. 806,763, filed on April 16, 1959).

As described in the latter patent application, a steroid starting compound having the general Formula IV in the Reaction Diagram II given below, in which E, $R^1$, X, Y have the same meaning as explained hereinbefore,

REACTION DIAGRAM II

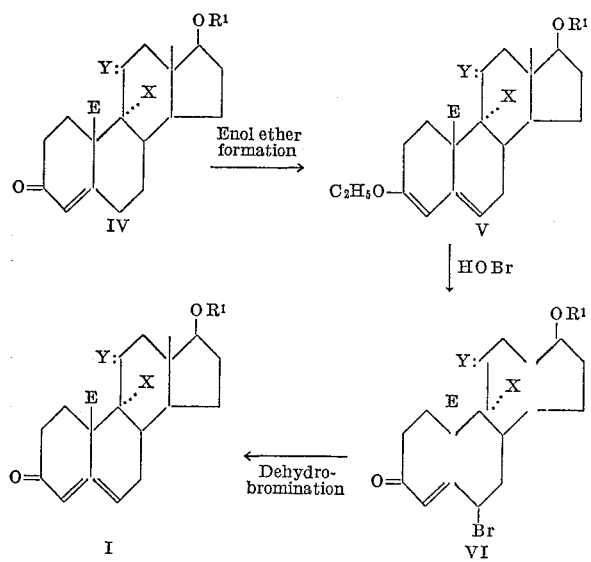

is converted into its 3-ethyl-enol-ether (V), which is treated with hypobromous acid to produce the known 6β-bromo-testosterone acetate or 6β-bromo-19-nor-testosterone acetate (VI). The enol-ether is produced by known methods, for example by reaction with ethyl orthoformate in mixture with ethanol and dioxane, under anhydrous conditions and in the presence of p-toluenesulfonic acid; the reaction with hypobromous acid can be effected with any reagent capable of liberating such acid, such as a N-bromoimide or N-bromoamide, or the hypobromite of an alkali metal or alkaline earth metal; preferably we employ N-bromo-succinimide in mixture with sodium acetate, acetic acid and acetone.

Intermediate VI is then dehydrobrominated to Δ⁴,⁶-androstadien-17β-ol-3-one 17-acetate, or its 19-nor-analog, respectively (I), for example by refluxing with calcium carbonate in mixture with dimethylformamide.

The starting compounds (I) prepared in the aforesaid manner were refluxed with an excess of potassium cyanide in 95% ethanol and thus we obtained a mixture of the respective 7α- and 7β-Δ⁴-compounds; the isomers were separated by chromatography. For introducing an additional double bond at C-1 of the 7-cyano-Δ⁴-compounds of the 10-methyl series, we refluxed them with selenium dioxide in mixture with t-butanol, in the presence of catalytic amounts of pyridine and under an atmosphere of nitrogen.

The C-17 hydroxyl group of all of the 7-cyano-17β-hydroxy compounds, obtained by the method of the present invention, can be esterified by conventional methods with the radicals of any of the acids specified above.

To those skilled in the art it is obvious that our method can be modified within wide limits. The introduction of the cyano group at C-7 implies the addition of the elements of hydrogen cyanide to the double bond at C-6,7 of the 6-dehydro compounds; therefore, there can be employed for this reaction instead of potassium cyanide any other reagent capable of generating hydrogen cyanide, such as the cyanide of another alkali or alkali-earth metal; the ethanol may be substituted by another hydroxylated solvent, such as methanol or mixtures of methanol or ethanol and water. We also applied microbiological methods for the dehydrogenation at C-1, such as incubation with *Corynebacterium simplex* ATCC 6946, and the like.

The invention will be further illustrated by a number of examples without being thereby limited in its scope.

*Example I*

A mixture of 5 g. of 6-dehydro-testosterone prepared as described by Sondheimer et al. in IACS 75, 5932, et seq. (1953), 10 g. of potassium cyanide and 250 cc. of 95% ethanol was refluxed for 2½ hours, cooled, diluted with water and the reaction product was extracted with ethyl acetate. The extract was washed with water, dried over anhydrous sodium sulfate and the solvent was evaporated. By chromatography of the residue on neutral alumina there were isolated 7α-cyano-testosterone and 7β-cyano-testosterone.

*Example II*

Example I is repeated with 6-dehydro-17α-methyl-testosterone, prepared by dehydrogenation of 17α-methyl-testosterone with chloranil, by using the method described in Patent No. 2,836,607, Example I, thus yielding 17α-methyl-7α-cyano-testosterone and 17α-methyl-7β-cyano testosterone.

The method of the preceding examples was applied to the compounds cited under I in the following table to prepare the end products listed under II:

| Ex. No. | I Starting material | Source of starting compound | II Final products |
|---|---|---|---|
| III | 17α-ethyl-6-dehydro-testosterone. | U.S. Patent 2,739,974 | 7α- and 7β-cyano-17α-ethyl-testosterone. |
| IV | 17α-vinyl-6-dehydro-testosterone. | Prepared from 17α-vinyltestosterone by the method of dehydrogenation described in Patent 2,836,607. | 7α- and 7β-cyano-17α-vinyl-testosterone. |
| V | 17α-propyn-(1)-yl-6-dehydro-testosterone. | Prepared from 17α-propyn-(1)-yl-testosterone (J. Pharm. Pharmacol, 1957, 929) by the dehydrogenation method of Patent 2,836,607. | 7α- and 7β-cyano-17α-propyn-(1)-yl-testosterone. |
| VI | 17α-ethynyl-6-dehydro-testosterone. | Prepared from 17α-ethynyltestosterone by the method of dehydrogenation described in Patent 2,836,607. | 7α- and 7β-cyano-17α-ethynyl-testosterone. |
| VII | 17α-propen-(1)-yl-6-dehydro-testosterone. | Prepared from 17α-propyn-(1)-yl testerone by hydrogenation to 17α-propen-(1)-yl-testosterone by the method described in J. Am. Chem. Soc. 77, 148 (1955) by Sandoval et al. and dehydrogenation of the latter compound by the method of Patent 2,836,607. | 7α- and 7β-cyano-17α-propen-(1)-yl-testosterone. |
| VIII | Δ⁴,⁶-androstadiene-3,17-dione. | Romo et al J. Org. Chem. 16, 1873 (1951) | 7α- and 7β-cyano-Δ⁴-androstene-3,17-dione. |
| IX | 6-dehydro-11β-hydroxy-testosterone. | Prepared from 11β-hydroxy-testosterone by the dehydrogenation method described in Patent 2,836,607. | 7α- and 7β-cyano-11β-hydroxy-testosterone. |
| X | 6-dehydro-17α-methyl-11β-hydroxy-testosterone. | Prepared from 17α-methyl-11β-hydroxytestosterone (Patent 2,638,533) by the method of Patent 2,836,607. | 7α- and 7β-cyano-17α-methyl-11β-hydroxy-testosterone. |
| XI | 6-dehydro-17α-ethyl-11β-hydroxy-testosterone. | Prepared from 17α-ethyl-testosterone by incubation with adrenal glands as described in Patent 2,781,292 followed by dehydrogenation by the method of Patent 2,836,607. | 7α- and 7β-cyano-17α-ethyl-11β-hydroxy-testosterone. |
| XII | 19-nor-Δ⁴,⁶-androstadiene-3,17-dione. | Prepared from 19-nor-Δ⁴-androstene-3,17-dione by the dehydrogenation method described in Patent 2,836,607. | 7α- and 7β-cyano-19-nor-Δ⁴-androstene-3,17-dione. |
| XIII | 6-dehydro-17α-ethynyl-19-nor-testosterone. | Prepared from 17α-ethynyl-19-nor-testosterone by the dehydrogenation method described in Patent 2,836,607. | 7α- and 7β-cyano-17α-ethynyl-19-nor-testosterone. |
| XIV | 6-dehydro-19-nor-11β-hydroxy-testosterone. | Patent 2,864,830 | 7α- and 7β-cyano-19-nor-11β-hydroxy-testosterone. |

Example XV

To a solution of 4.73 g. of 19-nor-testosterone in 24 cc. of anhydrous dioxane there was added 5 cc. of ethyl orthoformate and then 0.64 g. of a solution of 500 mg. of p-toluene-sulfonic acid monohydrate in 5.4 cc. of dioxane and 1.1 cc. of absolute ethanol; the mixture was kept at room temperature for 1 hour, the solvent was evaporated under reduced pressure and the residue was crystallized from methanol. There was thus obtained 3-ethoxy-19-nor-$\Delta^{3,5}$-androstadien-17$\beta$-ol.

A solution of 1.73 g. of the above compound in 140 cc. of acetone was cooled to 5° C. and treated with 10.4 cc. of water and 1.04 g. of anhydrous sodium acetate; the mixture was then treated with stirring with 1.33 g. of N-bromosuccinimide and 1.04 cc. of glacial acetic acid and then stirred for 1 hour at a temperature around 5° C. After diluting with water, the product was extracted with benzene and the extract was washed with water, dried over anhydrous sodium sulfate and evaporated to dryness. The residue consisted of the crude 6$\beta$-bromo-19-nor-testosterone which was used for the next step without further purification. In another experiment the pure compound was obtained by recrystallization from ether.

The above crude acetate was mixed with 3.2 g. of calcium carbonate and 40 cc. of dimethylformamide and refluxed under an atmosphere of nitrogen for 1 hour; the mixture was cooled, filtered and the filtrate was diluted with water and extracted with ethyl acetate. The extract was washed with water, dried over anhydrous sodium sulfate and the ethyl acetate was evaporated. The residue was chromatographed on neutral alumina and the solid fractions were recrystallized from acetone. There was thus obtained 19-nor-$\Delta^{4,6}$-androstadien-17-ol-3-one.

This latter compound was treated with potassium cyanide in ethanol, exactly as described in Example I. There were thus obtained 7$\alpha$-cyano-19-nor-testosterone and 7$\beta$-cyano-19-nor-testosterone.

The method of the latter example was applied to the compounds cited under I in the following table, to prepare the 7$\alpha$- and 7$\beta$-cyano derivatives listed below under II.

| Ex. | I Starting material | Source of starting compound | II Final products |
|---|---|---|---|
| XVI | 19-nor-17$\alpha$-methyl testosterone. | Known | 7$\alpha$- and 7$\beta$-cyano-19-nor-17$\alpha$-methyl testosterone. |
| XVII | 19-nor-17$\alpha$-vinyl testosterone. | A. Sandoval et al., J. Am. Chem. Soc., 77, 148 (1955). | 7$\alpha$- and 7$\beta$-cyano-19-nor-17$\alpha$-vinyl testosterone. |
| XVIII | 19-nor-11$\beta$-hydroxy-17$\alpha$-vinyltestosterone. | Patent 2,702,811 | 7$\alpha$- and 7$\beta$-cyano-19-nor-11$\beta$-hydroxy-17$\alpha$-vinyl testosterone. |
| XIX | 19-nor-17$\alpha$-ethyl-testosterone. | Known compound. | 7$\alpha$- and 7$\beta$-cyano-19-nor-17$\alpha$-ethyl testosterone. |

Example XX

By treating 6-dehydro-19-nor-17$\alpha$-propyn-(1)-yl-testosterone according to the procedure described in Example I there are obtained the 7$\alpha$- and 7$\beta$-cyano derivatives of 19-nor-17$\alpha$-propyn-(1)-yl testosterone.

The starting compound is prepared from 19-nor-$\Delta^4$-androstene-3,17-dione by treatment with propyne-(1) following the method described by Ruzicka et al. in Helv. Chim. Acta 20, 1280 (1937), followed by the dehydrogenation with chloranil, described in Patent 2,836,607, Example I.

Example XXI

By following the same procedure of Example I with 6 - dehydro-9$\alpha$-fluoro-11$\beta$-hydroxy-17$\alpha$-methyl-19-nor-testosterone there were obtained 7$\alpha$-cyano-9$\alpha$-fluoro-11$\beta$-hydroxy-17$\alpha$-methyl-19-nor-testosterone and 7$\beta$-cyano-9$\alpha$-fluoro-11$\beta$-hydroxy-17$\alpha$-methyl-19-nor-testosterone. The starting material was obtained from 17$\alpha$-methyl-9$\alpha$-fluoro-11$\beta$-hydroxy-19-nor-testosterone (U.S. Patent 2,793,218) by the dehydrogenation method of Patent 2,836,607.

Example XXII

Example I was repeated with 6-dehydro-17$\alpha$-ethynyl-11$\alpha$-hydroxy-9$\alpha$-fluoro-19-nor-testosterone, obtained from 11$\beta$-hydroxy-19-nor-testosterone (U.S. Patent 2,655,518) by the method of Fried et al. (U.S. Patent 2,852,511) followed by dehydrogenation with chloranil by the method of Patent 2,836,607, affording finally 7$\alpha$-cyano-17$\alpha$-ethynyl-11$\beta$-hydroxy-9$\alpha$-fluoro-19-nor-testosterone and 7$\beta$-cyano-17$\alpha$-ethinyl-11$\beta$-hydroxy-9$\alpha$-fluoro-19-nor-testosterone.

Example XXIII

Example I was repeated with 6-dehydro-17$\alpha$-vinyl-11$\beta$-hydroxy-9$\alpha$-fluoro-19-nor-testosterone, disclosed in U.S. Patent 2,836,607, yielding 7$\alpha$-cyano-17$\alpha$-vinyl-11$\beta$-hydroxy-9$\alpha$-fluoro-19-nor-testosterone and 7$\beta$-cyano-17$\alpha$-vinyl-11$\beta$-hydroxy-9$\alpha$-fluoro-19-nor-testosterone.

Example XXIV

A mixture of 2 g. of 7$\alpha$-cyano-testosterone, obtained as described in Example I, 100 cc. of t-butanol, 1.2 g. of selenium dioxide and 0.5 cc. of pyridine was refluxed for 48 hours. It was then filtered through celite, the solvent was removed under reduced pressure and the residue was decolorized with charcoal by refluxing its acetone solution for 1 hour. The solvent was evaporated and the residue was purified by chromatography on neutral alumina, thus giving 7$\alpha$-cyano-1-dehydro-testosterone.

A mixture of 1 g. of the above compound, 5 cc. of pyridine and 1 cc. of acetic anhydride was kept overnight at room temperature. It was then poured into water, heated for half an hour on the steam bath, cooled and the precipitate was collected by filtration, washed with water, dried and recrystallized from acetone-hexane, thus yielding 7$\alpha$-cyano-1-dehydro-testosterone acetate.

Example XXV

By treating 7$\alpha$-cyano-11$\beta$-hydroxy-19-nor-testosterone, obtained as described in Example XIV, according to the second step of the method of the previous example, but substituting the acetic anhydride by propionic anhydride, there was obtained 7$\alpha$-cyano-11$\beta$-hydroxy-19-nor-testosterone 17-propionate.

Example XXVI

By the reaction with selenium dioxide (see Example XXIV), 1 g. of 17$\alpha$-ethynyl-7$\alpha$-cyano-testosterone (Example VI) was converted into 17$\alpha$-ethynyl-7$\alpha$-cyano-1-dehydro-testosterone. A mixture of 500 mg. of the latter, 5 cc. of pyridine and 2 cc. of cyclopentylpropionic anhydride was heated for 24 hours at a temperature around 90° C. and poured into water, heated for half an hour on the steam bath and cooled; the product was extracted with methylene chloride and the extract was washed to neutral, dried over anhydrous sodium sulfate and the solvent was evaporated. By recrystallization of the residue from acetone-hexane there was obtained 17$\alpha$-ethynyl-7$\alpha$-cyano-1-dehydro-testosterone 17-cyclopentylpropionate.

Example XXVII

A solution of 2 g. of 17$\alpha$-methyl-7$\alpha$-cyano-9$\alpha$-fluoro-11$\beta$-hydroxy-19-nor-testosterone (Example XXI) in 100 cc. of benzene was treated with 5 g. of benzoic anhydride and 300 mg. of p-toluenesulfonic acid and kept at room temperature for 48 hours. After diluting with water the benzene layer was separated, washed with water and evaporated to dryness. The residue was treated with 100 cc. of a 1% methanolic solution of potassium hydroxide and kept for 1 hour at 0° C. under an atmosphere of nitrogen. The mixture was acidified with acetic acid, concentrated to a small volume and diluted with water; the product was extracted with methylene chloride and the extract was washed with water, dried over anhydrous sodium sulfate and evaporated to dryness. By recrystallization of the residue from acetone-hexane there was obtained 17α-methyl-7α-cyano-9α-fluoro-11β-hydroxy-19-nor-testosterone 17-benzoate.

*Example XXVIII*

1 g. of 7α-cyano-17α-methyl-9α-fluoro-11β-hydroxy-19-nor-testosterone, obtained in Example XXI, was treated with 0.6 g. of selenium dioxide and 0.25 cc. of pyridine, exactly as described in Example XXIV; after chromatography on neutral alumina, 7α-cyano-17α-methyl-9α-fluoro-11β-hydroxy-1-dehydrotestosterone was obtained.

*Example XXIX*

1 gram of 7β-cyano-11β-hydroxy-testosterone obtained according to Example IX, is converted to the 17-acetate by a conventional method of acetylation, and to the resulting ester there is added an 8-Normal solution of chromic acid in acetone and a small amount of sulfuric acid; the resulting 7β-cyano-11-keto-testosterone 17-acetate is isolated by chromatography in a well-known manner, and the acetate is then conventionally saponified, so that 7β-cyano-11-keto-testosterone is obtained.

*Example XXX*

By repeating Examples XXIV, XXV, XXVI, XXVII, and XXVIII, but replacing in these examples the 7α-cyano compound used as a starting material by the corresponding 7β-cyano derivative, there were obtained, respectively, 7β-cyano-1-dehydro-testosterone and the acetate thereof; 7β-cyano-11β-hydroxy-19-nor-testosterone 17-propionate; 17α-ethynyl-7β-cyano-1-dehydro-testosterone cyclopentylpropionate; 17α-methyl-7β-cyano-9α-fluoro-11β-hydroxy-19-nor-testosterone 17-benzoate; and 17α-methyl-7β-cyano-9α-fluoro-11β-hydroxy-1-dehydrotestosterone.

We claim:

1. A new steroid compound corresponding to the general formula:

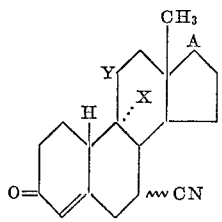

in which A is an arrangement selected from the group consisting of

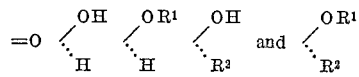

wherein $R^1$ is an acyl radical derived from a hydrocarbon carboxylic acid having up to 12 carbon atoms and $R^2$ is an aliphatic hydrocarbon radical selected from the group of lower alkyl, alkenyl and alkynyl radicals; Y is an arrangement selected from the group consisting of

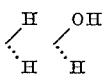

and =O; X is hydrogen when Y is

and is selected from the group consisting of hydrogen and fluorine, when Y is one of the other two members of its group, and ~CN is selected from the group consisting of 7α-cyano and 7β-cyano.

2. A new steriod compound corresponding to the general formula

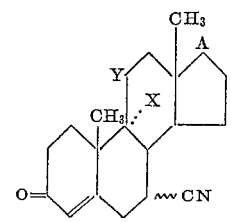

in which A is an arrangement selected from the group consisting of

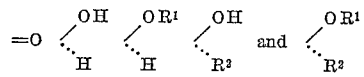

wherein $R^1$ is an acyl radical derived from a hydrocarbon carboxylic acid having up to 12 carbon atoms and $R^2$ is an aliphatic hydrocarbon radical selected from the group of lower alkyl, alkenyl and alkynyl radicals; Y is an arrangement selected from the group consisting of

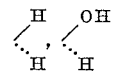

and =O; X is hydrogen when Y is

and is selected from the group consisting of hydrogen and fluorine, when Y is a member of its group other than

and ~CN is selected from the group consisting of 7α-cyano and 7β-cyano.

3. 7-cyano-testosterone.
4. 17α-methyl-7-cyano-testosterone.
5. 7-cyano-17α-ethyltestosterone.
6. 7-cyano-17α-vinyltestosterone.
7. 7-cyano-17α-propen-(1)yl-testosterone.
8. 7-cyano-17α-ethynyltestosterone.
9. 7-cyano-17α-propyn-(1)yl-testosterone.
10. 7-cyano-11β-hydroxytestosterone.
11. 7-cyano-17α-methyl-11β-hydroxytestosterone.
12. 7-cyano-17α-ethynyl-19-nor-testosterone.
13. 7-cyano-19-nor-11β-hydroxytestosterone.
14. 7-cyano-19-nor-testosterone.
15. 7-cyano-19-nor-17α-methyltestosterone.
16. 7-cyano-19-nor-11β-hydroxy-17α-vinyltestosterone.
17. 7-cyano-1-dehydrotestosterone.
18. 7 - cyano - 17α-methyl-9α-fluoro-11β-hydroxy-1-dehydrotestosterone.
19. 7-cyano-11-keto-testosterone.

20. A new steroid compound corresponding to the general formula:

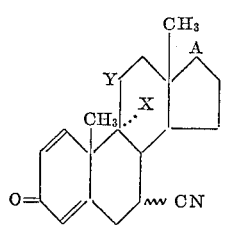

in which A is an arrangement selected from the group consisting of

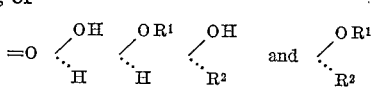

wherein $R^1$ is an acyl radical derived from a hydrocarbon carboxylic acid having up to 12 carbon atoms and $R^2$ is an aliphatic hydrocarbon radical selected from the group of lower alkyl, alkenyl and alkynyl radicals; Y is an arrangement selected from the group consisting of

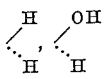

and =O; X is hydrogen when Y is

and is selected from the group consisting of hydrogen and fluorine, when Y is a member of its group other than

and ~CN is selected from the group consisting of 7α-cyano and 7β-cyano.

References Cited in the file of this patent

Bowers et al.: "Journal of American Chemical Society" (81), 1959, p. 5233.